United States Patent
Judy, Jr.

[11] Patent Number: 5,849,185
[45] Date of Patent: Dec. 15, 1998

[54] GRAVITY VACUUM SYSTEM

[76] Inventor: Donald M. Judy, Jr., 2421 Ivanhoe St., Port Charlotte, Fla. 33952

[21] Appl. No.: 786,257

[22] Filed: Jan. 22, 1997

[51] Int. Cl.[6] .................................................... A01K 63/04
[52] U.S. Cl. ...................... 210/169; 210/232; 210/416.2; 119/215; 119/226; 119/245; 119/248; 119/264; 119/269
[58] Field of Search ..................................... 210/169, 232, 210/416.2; 119/204, 205, 207, 211, 215, 217, 226, 245, 246, 247, 248, 259, 264, 269

[56] References Cited

U.S. PATENT DOCUMENTS

| | | | |
|---|---|---|---|
| 2,787,981 | 4/1957 | Landesberg | 119/269 |
| 3,515,097 | 6/1970 | Sherman | 119/269 |
| 3,638,616 | 2/1972 | Carmouche | 119/264 |
| 3,827,560 | 8/1974 | Morton | 210/169 |
| 3,893,421 | 7/1975 | Dinnerstein | 119/269 |
| 4,098,230 | 7/1978 | Jackson | 210/169 |
| 4,897,188 | 1/1990 | Ogawa | 210/169 |
| 4,913,811 | 4/1990 | Huang et al. | 210/169 |
| 5,172,650 | 12/1992 | Hsu et al. | 210/169 |

FOREIGN PATENT DOCUMENTS 3810999 10/1989 Germany ................ 119/264

Primary Examiner—Peter A. Hruskoci
Assistant Examiner—Theodore M. Green
Attorney, Agent, or Firm—Frank A. Lukasik

[57] ABSTRACT

A gravity vacuum system for a fish tank which will fit onto any standard fish tank and will get rid of waste through a gravitational system. The top of the system is a false bottom for the upper portion of the fish tank. The false bottom features openings small enough to allow the waste to pass. A solid pyramid directly in the middle of the lower one third supports the false bottom. At the right and left foot of the pyramid are drainage valve areas enclosed in boxes. When the drainage valves are opened, the waste flows through the false bottom and into the triangular areas and left of the pyramid. The waste then flows down through the triangular spaces and into the drainage valve areas. The owner then hooks connective tubing to the drainage valves for easy drainage.

3 Claims, 8 Drawing Sheets

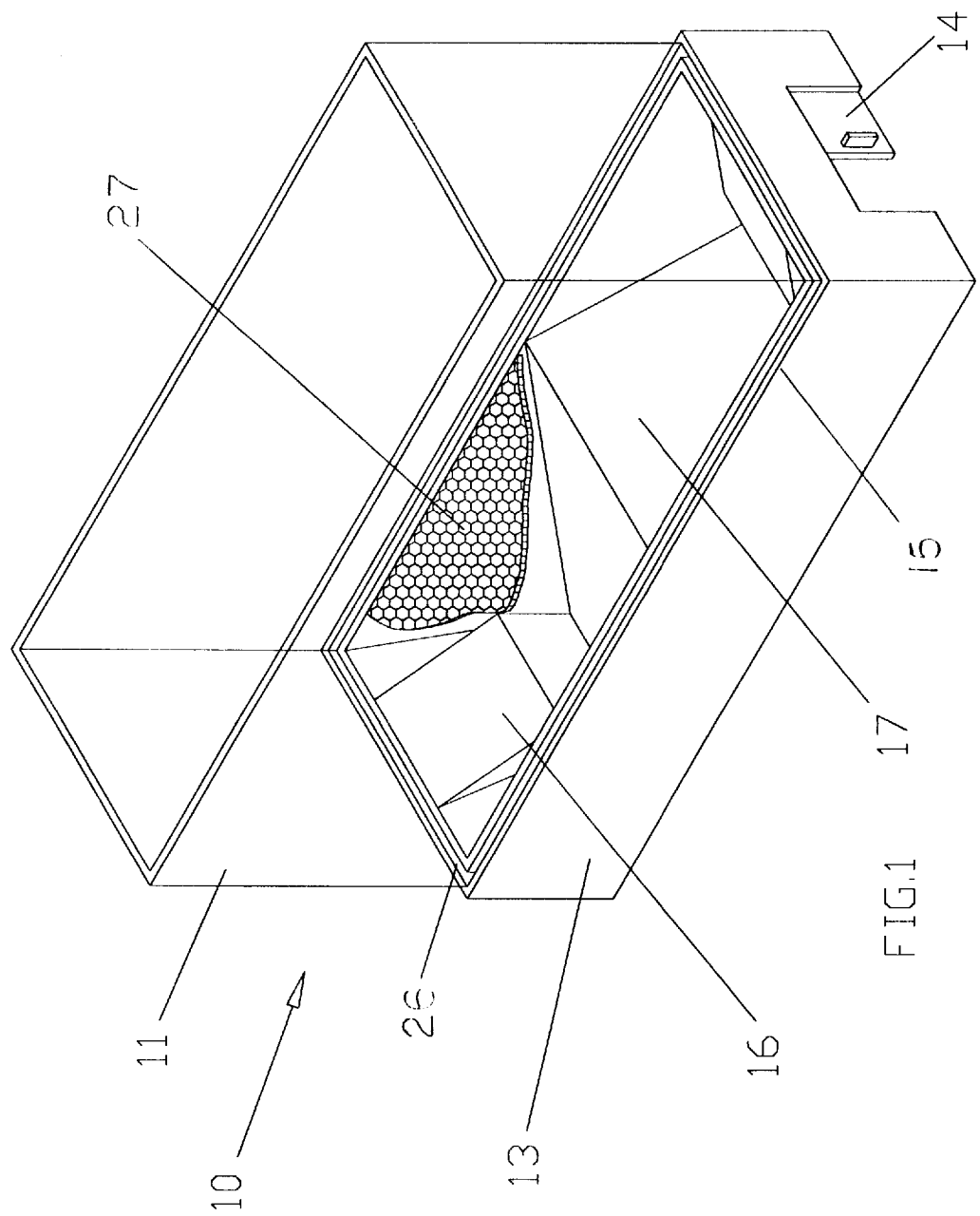

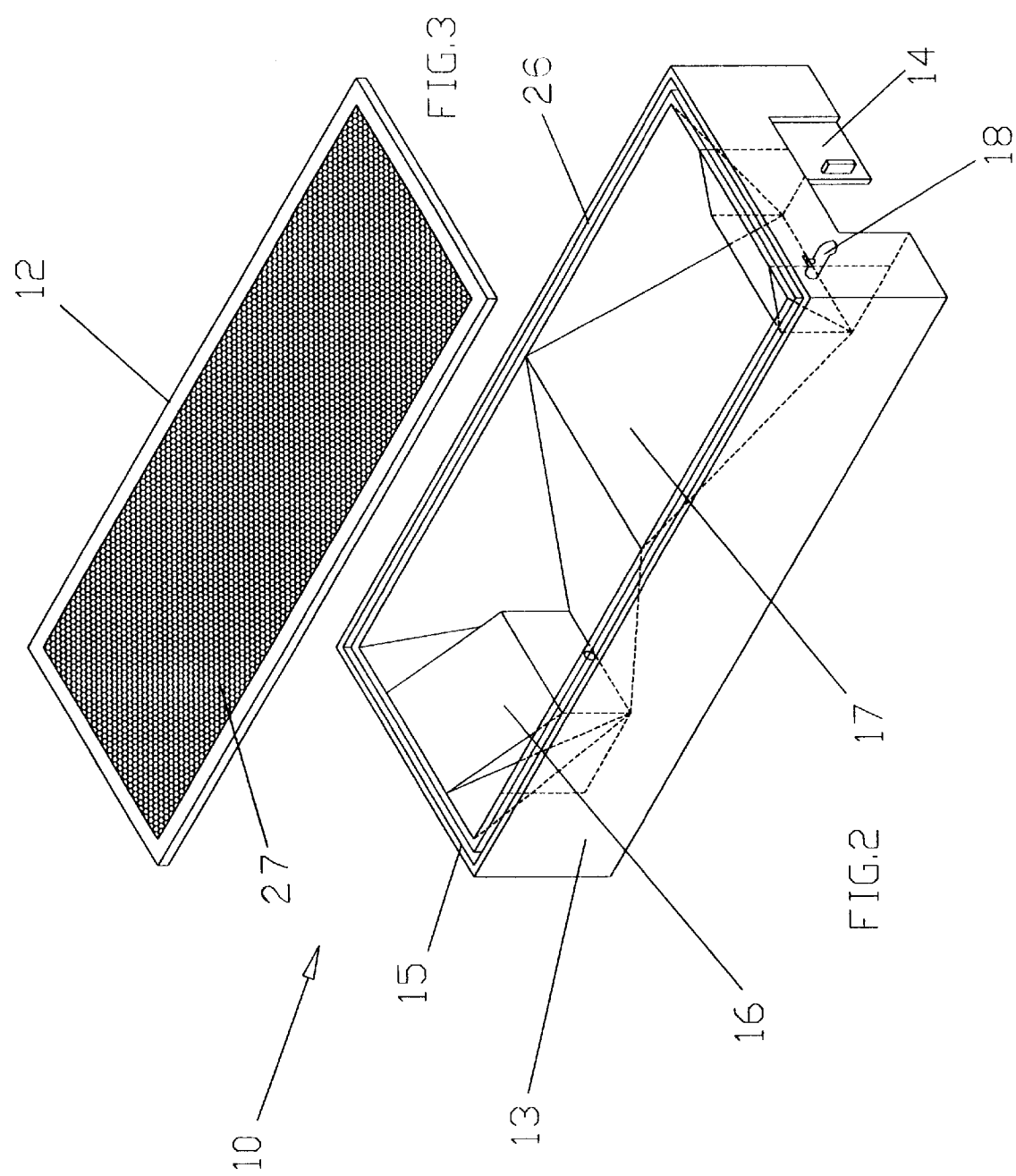

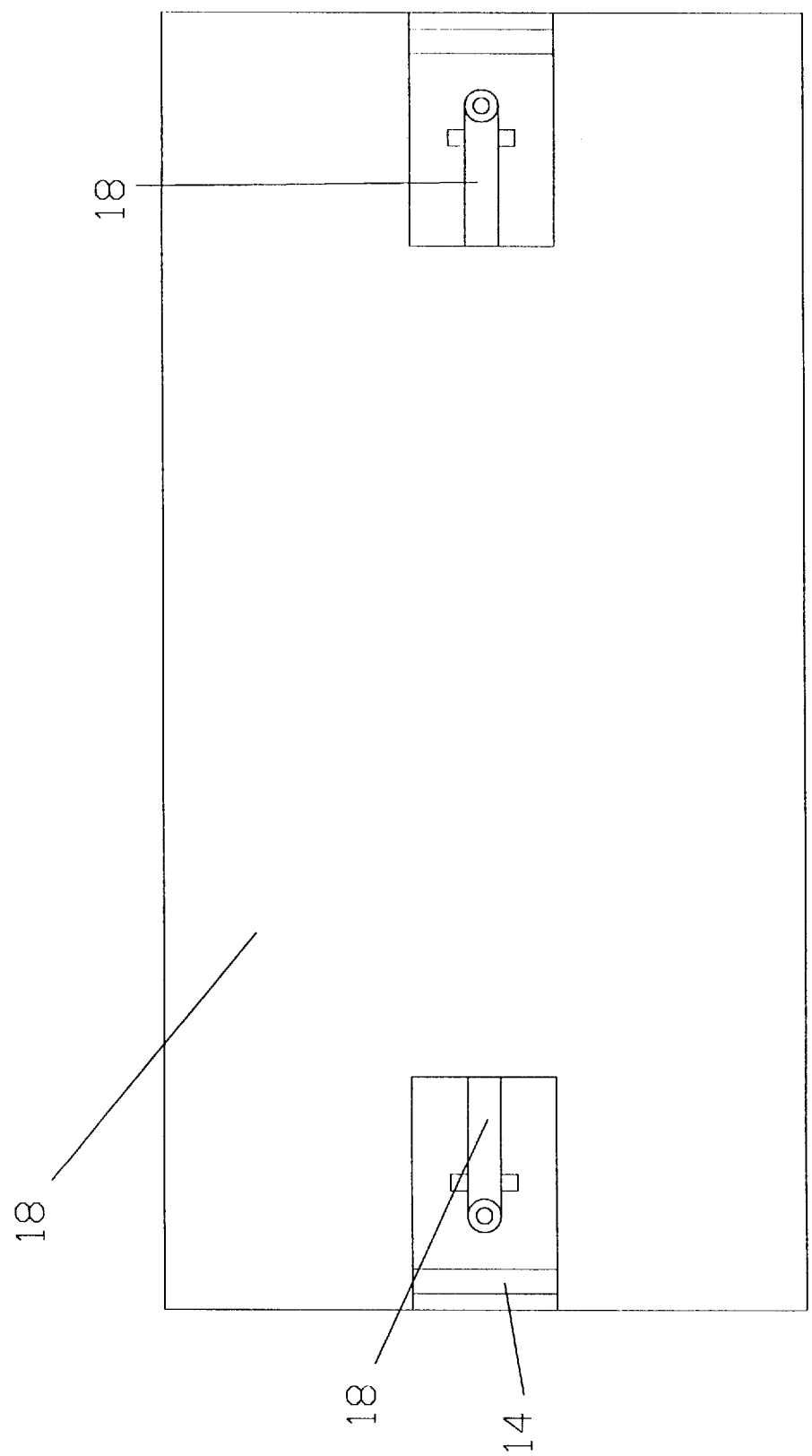

GRAVITY VACUUM SYSTEM

BACKGROUND OF THE INVENTION

1. Field of the Invention

The present invention relates generally to a fish tank drainage system and more particularly to a gravity operated system for cleaning and maintaining standard household fish tanks using the weight of the water to flush the bottom of the tank into drainage valve areas.

2. Description of the Prior Art

In raising fish in fish tanks, the tanks must be regularly cleaned so that the optimum natural conditions for fish can be maintained. One method of cleaning the tank consists of removing the fish, draining the tank, and then vacuuming the bottom. Besides wasting large amounts of water, draining and replacing the water shocks the fish and endangers their wellbeing. Another method of keeping a fish tank clean is to use a drain filter. In U.S. Pat. No. 5,290,437 to Lin, includes a drum filter fastened to the lowest bottom of a fishpond, cylindrical brushes fastened inside the drum filter to remove debris and impurities from the water passing through, a first water pump to pump water from the fishpond through a clean water recycling pipe via the drum filter for circulation and filtration, a second water pump to pump a sudden rush of water from the fishpond into a drain pipe through the drum filter for carrying debris and impurities away from the drum filter.

In U.S. Pat. No. 460,809 to Gunther, discloses a fish tank comprising an upper portion composed of glass and in the base of the tank, a central depression, tapering to a contracted outlet at the bottom. The depression is covered by a tray which has a central opening surrounded by a wall or flange. Outside of the flange are a series of projecting step-like lugs, on which rests the cylindrical base or support of a bowl in the bottom of which is a series of openings. Within the bowl or basin is a central conical projection or mound and around this mound and within the bowl, stones rocks and plants are placed, and sand is placed within the tray.

The above references as well as other prior art devices require complex filtering systems or vacuuming units to clean the bottom to remove settled waste. Using a prior art vacuum cleaner often clouds the water with waste, thus disturbing and stressing the fish.

SUMMARY OF THE INVENTION

The gravity vacuum system of the invention provides for the manufacture of a specially designed plastic housing which will fit onto any standard fish tank and will get rid of waste through a gravitational system. The upper ⅔ of the tank holds the water for the living area for the fish. The bottom ⅓ of the tank features a gravity vacuuming system. The top of the system is a false bottom for the upper portion of the fish tank. The false bottom features openings small enough to allow the waste to pass, but they are not large enough for the rocks or gravel to pass. A solid pyramid directly in the middle of the lower ⅓ supports the false bottom. At the right and left foot of the pyramid are drainage valve areas enclosed in boxes. When the drainage valves are opened, the waste flows through the false bottom and into the triangular areas and left of the pyramid. The waste then flows down through the triangular spaces and into the drainage valve areas. The owner then hooks connective tubing to the drainage valves for easy drainage.

BRIEF DESCRIPTION OF THE DRAWINGS

FIG. 1 is a top perspective view, partially in section, of an aquarium mounted on the gravity vacuum system of the invention.

FIG. 2 is a top perspective view of the gravity vacuum system of the invention.

FIG. 3 is a top perspective view of the false bottom of the gravity system of the invention.

FIG. 4 is a bottom view of the of the gravity vacuum system of the invention.

DETAILED DESCRIPTION OF THE INVENTION

Figure 5:
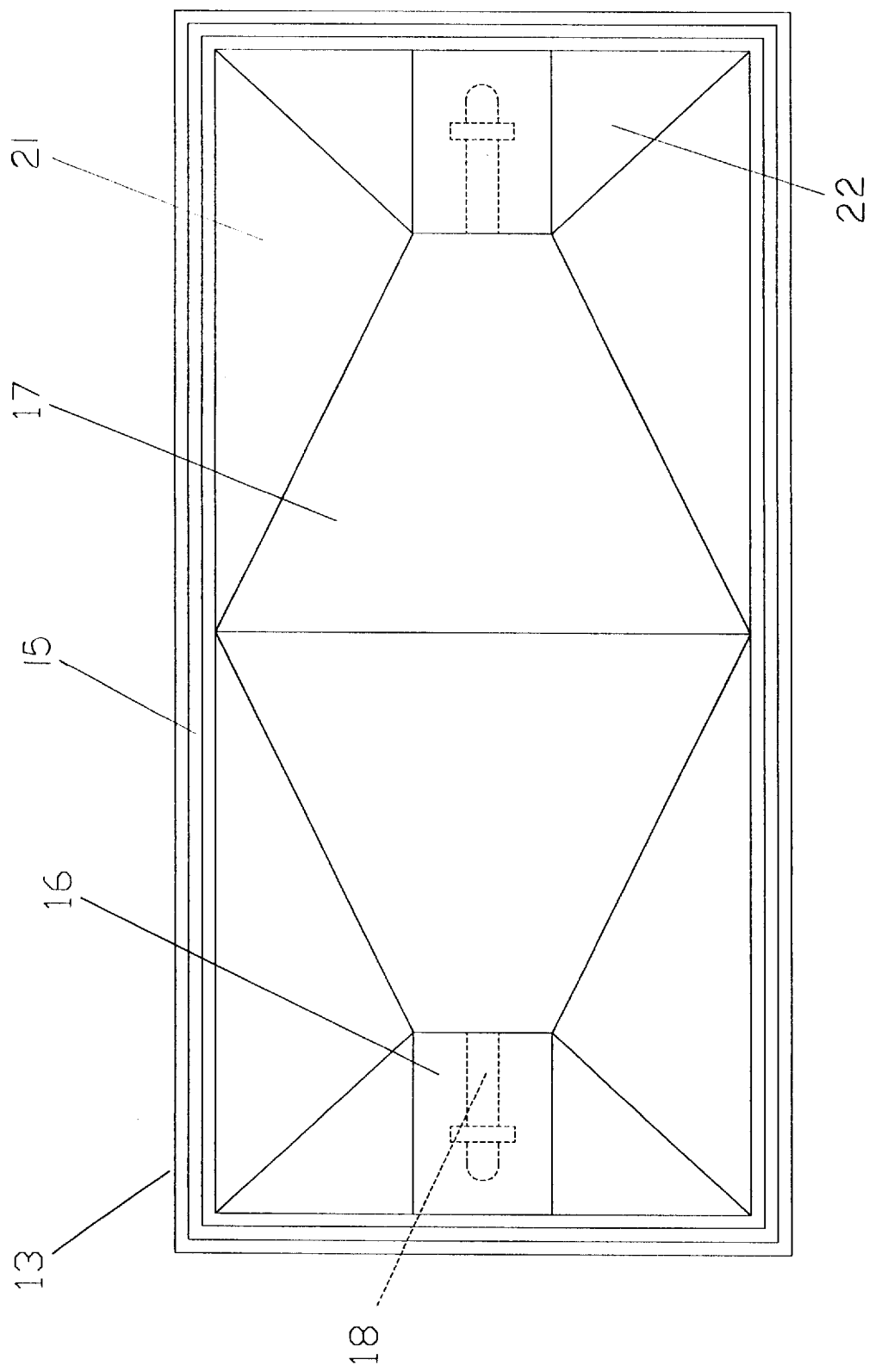
FIG. 5 is a top view of the gravity vacuum system of the invention.
Figure 6:
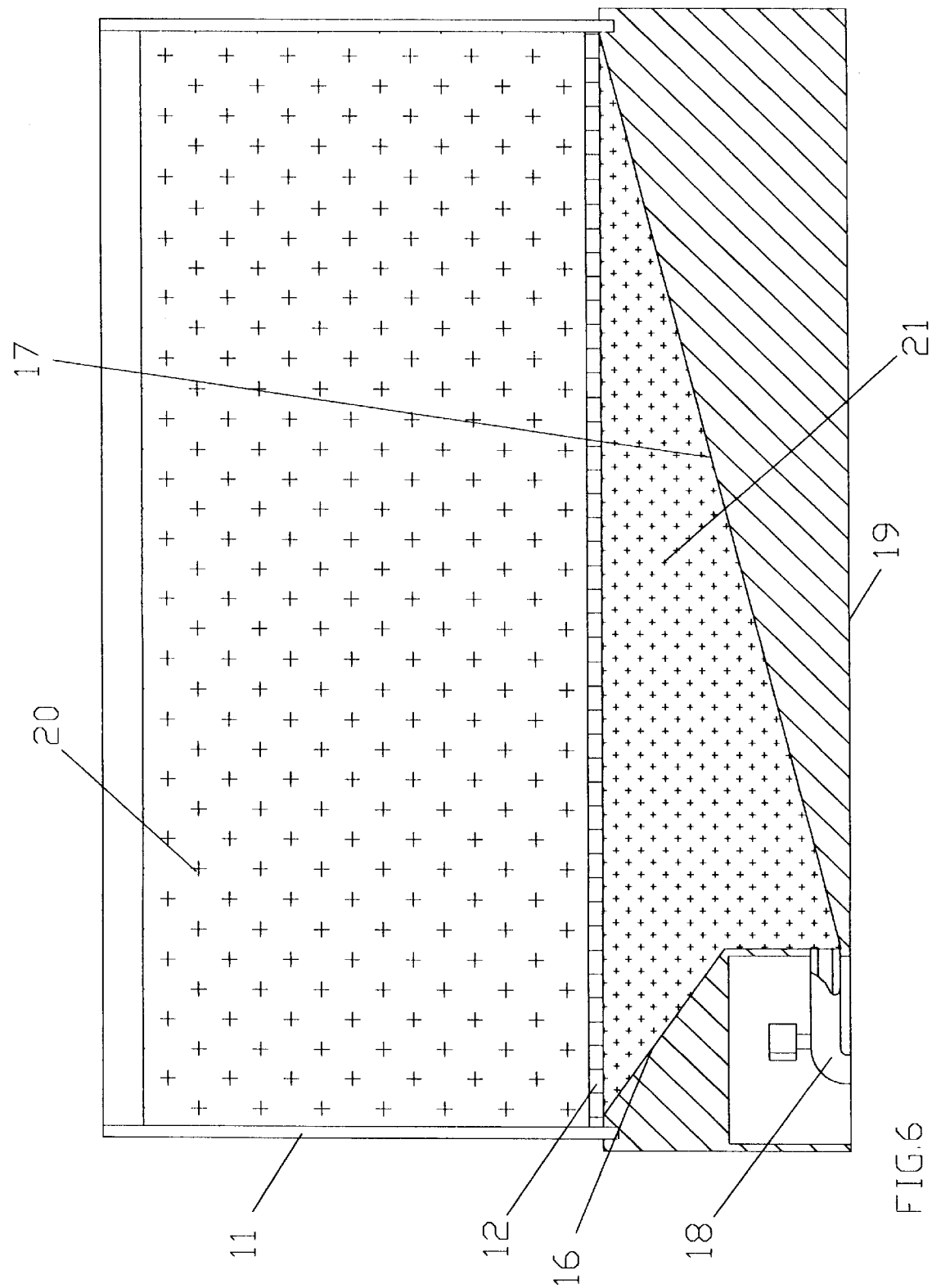
FIG. 6 is a side view, partially in section, of the aquarium with the gravity vacuum system of the invention.
Figure 7:
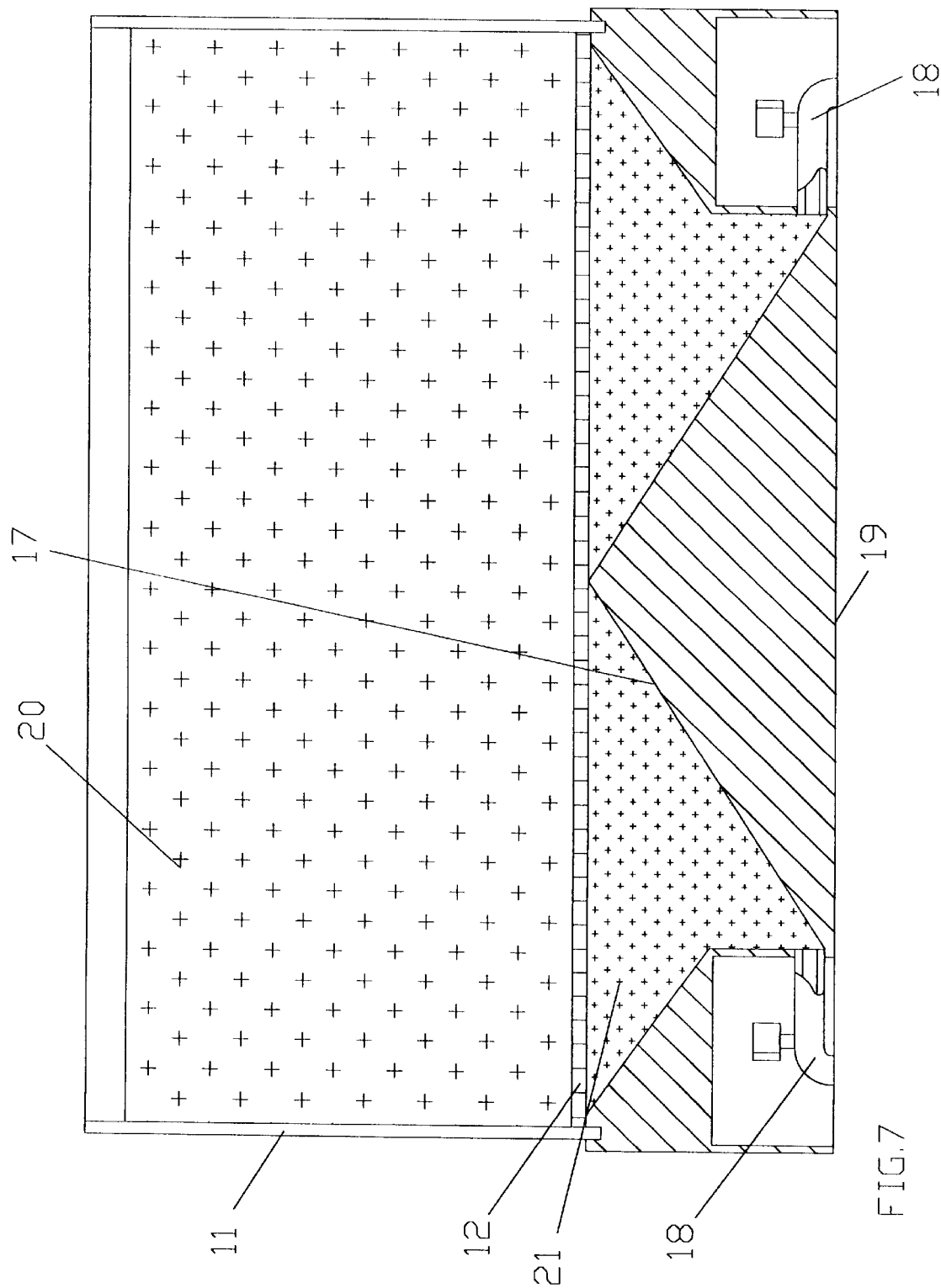
FIG. 7 is a side view, partially in section, of a larger aquarium with the gravity system of the invention.
Figure 8:
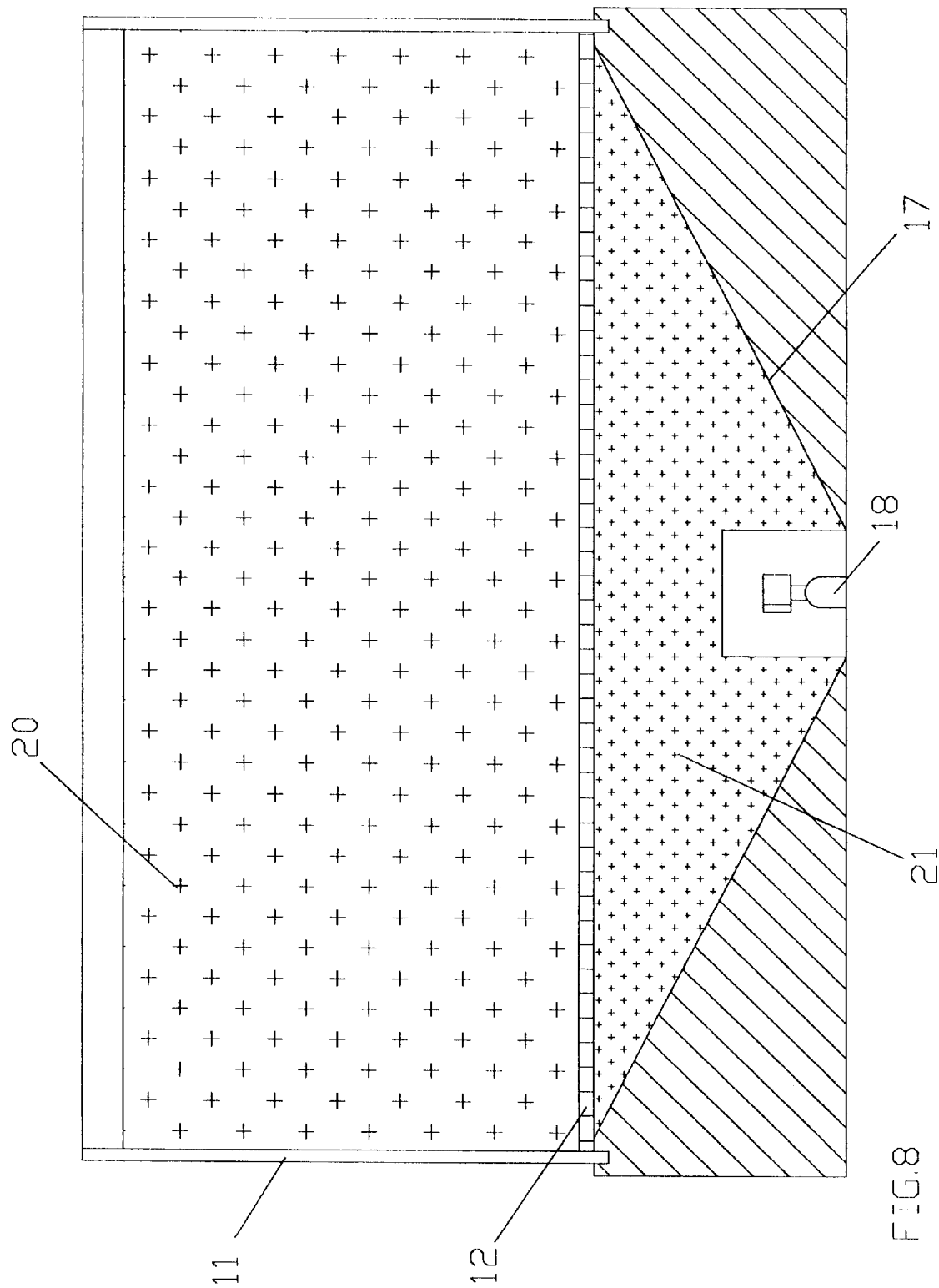
FIG. 8 is a side view, partially in section, of a medium size aquarium with the gravity system of the invention.
Figure 9:
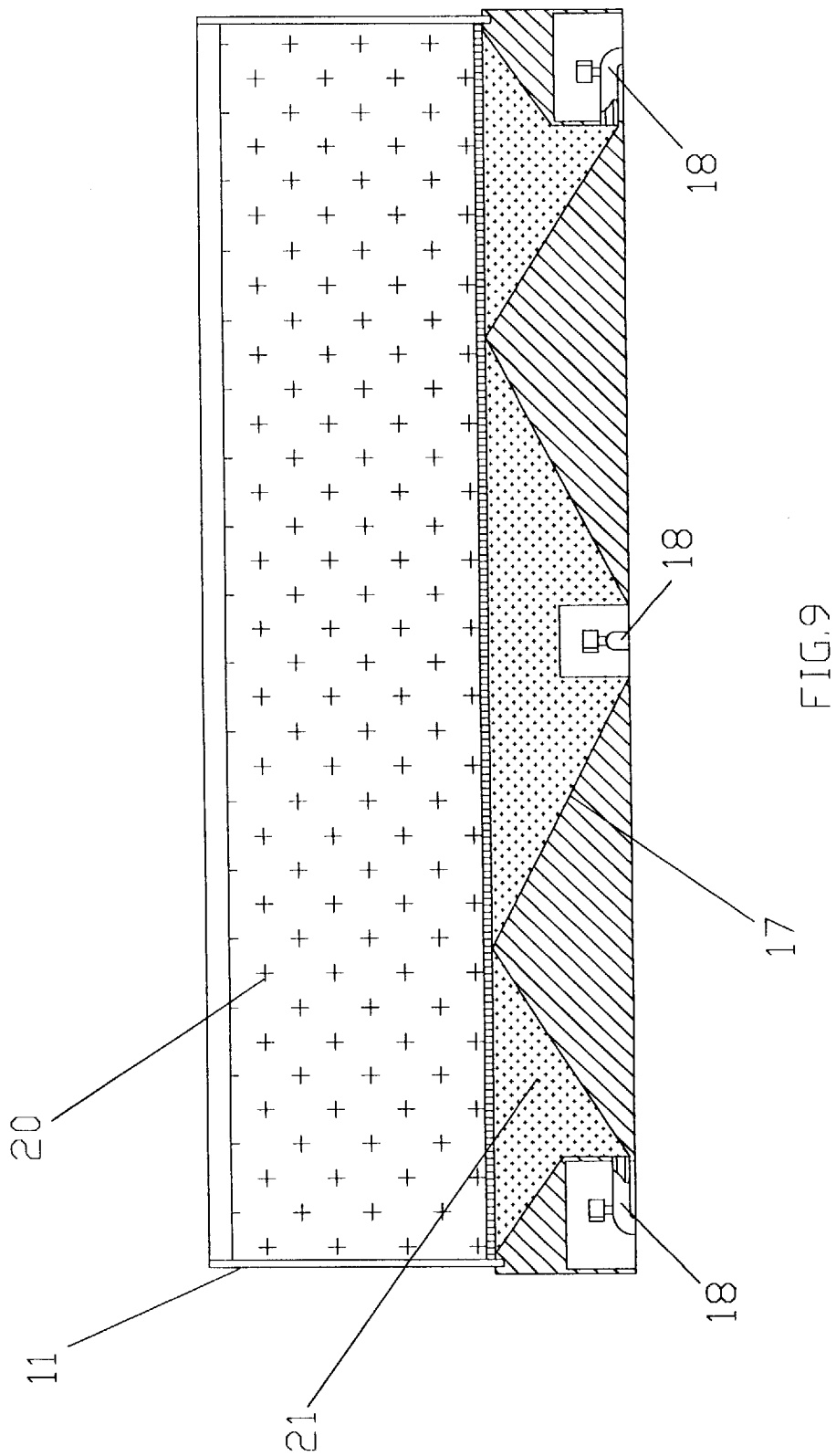
FIG. 9 is a side view, partially in section, of a large size aquirium with the gravity system of the invention.

Referring to FIGS. 1 and 2, a gravity vacuum system 10 in accordance with the present invention is generally comprised of a fish tank 11, a false bottom 12, and a base 13. The base 13 may be fabricated from plastic using state of the art manufacturing processes such as injection molding, vacuum forming, etc. The base 13 is generally in the shape of a rectangular box. The size of the base 13 may vary depending on the size of the fish tank 11. For example, the shape of base 13 shown in FIG. 1, may be used for a 55 to 100 gallon fish tank 11 with directional slants 17, 21 and 22 beginning with a peak at the midpoint of the base 13 to the bottom 19, and touching the sloping valve enclosure 16 at the point it meets the bottom 19. FIG. 6 shows a base 13 which may be used for a 10 gallon fish tank 11. FIG. 8 shows a base 13 which may be used for a 30 gallon fish tank 11. FIG. 9 shows a base 13 which may be used for a fish tank larger than 100 gallons. For a fish tank 11, which is larger than 100 gallons, providing the slants 17, 21, and 22 helps to funnel the waste 20 and 21 toward the lowest point where valve 18 is located without leaving any flat spots on the bottom to collect and remain within the base 13.

To accomplish this, the gravity vacuum system consists of a plastic housing 13 configured to maximize the flow of waste 20 down through the water in the aquarium 11, and out through the drainage valves 18. The housing 13 is rectangular in shape and is divided into compartments by the intersection of the several walls. All interior walls 16, 17, 21 and 22 are formed at sloping angles with no horizontal flat areas on which waste can accumulate. Each compartment is equipped with a drainage valve 18 connection at the bottom. A sliding door 14 is positioned behind the valve 18 connections so that a conventional drainage tube can be affixed to the valve 18.

The upper edge 15 of the housing 13 is formed with a horizontal lip 25 fashioned into a tongue-in-groove design to match a corresponding false bottom 12 that fits over the housing 13. This allows for a tight fit and enables the gravity vacuum system to work with an aquarium of any size and to accomodate any thickness of glass. The valve 18 is placed at the lowest point possible in the valve enclosure 16 to assure the complete drainage of the bottom 19, of base 12. The valve 18 is shown with the drainage valve 18 pointing downwardly in order to locate the valve 18 at the bottom of base 13. The valve 18 may also be pointed horizontally (not shown) for convenient attachment of a drain hose (not shown) for emptying the fish tank 11 and for cleaning purposes.

The depth of the base 13 may vary depending on the size of the fish tank 11. For example, the depth of the base may vary from 4" to 6" for the range of sizes of fish tank 11. The angle of the slants will vary with the size of the fish tank 11. The slants are used in every side of the bottom 12 to assure that there are no horizontal planes where waste 20 would collect if they were not deflected downwardly by the slanted sides.

The base 13 has an upper edge 15 with a groove 26 formed in the center of the upper edge 15 around the entire top surface. The groove 26 is formed sufficiently deep to form a tongue and groove connection when the glass of the fish tank 11 is assembled into the groove 26. The glass tank 11 is sealed to the upper edge 15, and the four corners of the fish tank 11 with an appropriate silicon sealing material well known in the art.

A sliding door 14 may be placed at each of the ends of base 13 where the valves 18 are located to conveniently conceal the valves 18 and their openings for esthetic purposes. The valves 18 are inset within the base 13 so that the fish tank 11, mounted on the base 13, will fit on conventional tank stands. The valves 18 can be opened individually or at the same time, easily drained into 5 gallon buckets with some type of plastic hose or tubing. The false bottom 12 will have small slits 27 to permit the wastes 20 to flow through while retaining the aquarium rocks, gravel, or other material simulating a natural bottom. The slits 27 will be small enough to permit waste 20 to sift through the slits 27 and become concentrated in the chambers in the water in base 13 as indicated by the numeral 21 in FIG. 8.

When it is time to clean the tank, the owner may simply hook up the valves 18 as described above and open the valves 18. The weight of the water above the false bottom 12 will begin to cause a downwardly flowing current which will flow through the slits 27 into the chambers formed by the slants 16 and 17 thereby vacuuming the surfaces of the slants 16 and 17 as it passes over the slants 16 and 17 and exiting through the valves 18. Generally only one third of the water in the fish tank 11 is removed and replaced with fresh water to reduce the shock effect that changing the water may have on the fish.

While a principle of the present invention has been described above in connection to one preferred embodiment of the invention, it is intended that all matter contained in the above description and illustrated in the accompanying drawings shall be interpreted to be illustrative and not in a limiting sense.

What is claimed is:

1. The combination of a fish tank filled with water and a base forming a self-cleaning aquarium, the base consisting of:

a plastic housing having a horizontal lip formed in a tongue-in-groove shape with a vertical groove formed in the center of said horizontal lip to a depth sufficient to retain the sides of a fish tank in a vertical position, said fish tank being inserted in said vertical groove and joined and sealed watertight with a silicone sealing material, a false bottom having a plurality of slits for adequate water flow during release of water, said false bottom mounted on said tongue-in-groove shape within said fish tank, a plurality of compartments formed by directional slants and sloping valve enclosures formed in said plastic housing, beginning at said upper edge and forming a peak at a first end and touching said sloping valve enclosure at a point meeting said bottom, the number of said peaks and said bottom points forming said compartments being determined by a range of sizes of said fish tanks, and a valve mounted in each of said valve enclosures at a point near said bottom for vacuuming said directional slants and sloping valve enclosures and draining said water containing waste matter.

2. The combination of a fish tank filled with water and a base of claim 1 wherein the depth of said housing may vary in a range from 4" to 6" for a different range of fish tank sizes.

3. The combination of a fish tank filled with water and a base of claim 1 wherein the exterior of said valve enclosures are concealed with sliding doors.

* * * * *